United States Patent [19]

Baumoel

[11] Patent Number: 4,929,368

[45] Date of Patent: May 29, 1990

[54] FLUOROETHER GREASE ACOUSTIC COUPLANT

[76] Inventor: Joseph Baumoel, 155 Plant Ave., Hauppauge, N.Y. 11788

[21] Appl. No.: 376,529

[22] Filed: Jul. 7, 1989

[51] Int. Cl.$^5$ .......................................... C10M 107/38
[52] U.S. Cl. ...................................... 252/11; 252/54; 252/58; 156/333
[58] Field of Search ............................ 252/11, 54, 58; 156/333

[56] References Cited

U.S. PATENT DOCUMENTS

| | | | |
|---|---|---|---|
| 3,970,504 | 7/1976 | Palmer | 156/329 |
| 3,987,674 | 10/1976 | Baumoel | 73/861.28 |
| 4,144,517 | 3/1979 | Baumoel | 367/93 |
| 4,324,673 | 4/1982 | Christian et al. | 252/58 |
| 4,373,401 | 2/1983 | Baumoel | 73/861.18 |
| 4,472,290 | 9/1984 | Caporiccio et al. | 252/58 |
| 4,724,092 | 2/1988 | Fukui et al. | 252/54 |
| 4,738,737 | 4/1988 | Runde et al. | 156/91 |
| 4,757,145 | 7/1988 | Caporiccio et al. | 252/47 |
| 4,803,005 | 2/1989 | Juhlke et al. | 252/54 |

OTHER PUBLICATIONS

Pacesetter; The Newsletter for KRYTOX® Fluoronated Lubricants, Spring, 1988, DuPont Company.
Pacesetter; The Newsletter for Performance Lubriciants, Winter, 1988, DuPont Company.
One Grease Fits All, August, 1988, DuPont Company.
KRYTOX® General Purpose Lubricants, Dec. 1988, DuPont Company.
NYE Specialty Lubricants; NYE FLUOROETHER GREASE 849, William F. Nye Inc.
Material Safety Data Sheet NYE/849; NYE FLUOROETHER GREASE 849, Apr. 1987, William F. Nye Inc.

*Primary Examiner*—Jacqueline V. Howard
*Attorney, Agent, or Firm*—Ostrolenk, Faber, Gerb & Soffen

[57] ABSTRACT

A couplant material for establishing a sonic path of good acoustical impedance between an ultrasonic transducer and a sonic medium. The material is capable of being easily shaped at room temperature and withstanding vibration and thermal cycling from room temperature to over 500° F. while substantially maintaining its acoustical properties and providing a minimum of irritating fumes and outgasses. A preferred couplant material is a polytetrafluoroethylene grease or perfluoropolyalkylether grease, which have been used previously as lubricants.

5 Claims, 2 Drawing Sheets

FLUOROETHER GREASE ACOUSTIC COUPLANT

BACKGROUND OF THE INVENTION

The present invention relates to a method of attaching an ultrasonic transducer to a surface for good acoustic transmission and to a novel ultrasonic coupling compound.

A coupling medium, such as a grease or the like, is frequently used to insure that ultrasonic energy can be transmitted between a transducer and the structure to which it is connected. It is necessary to use a coupling medium which will not degrade rapidly in its sonic conduction ability and which will remain in place in the space between the transducer and the surface to which it is connected. Ultrasonic transducers are frequently clamped to surfaces in an environment in which the coupling material will be subject to high temperature, vibration and other harsh environmental conditions. For example, "clamp-on" ultrasonic flowmeters which monitor fluid flow as disclosed in either of Baumoel patents 3,987,674 or 4,373,401 or fluid level as shown in Baumoel patent 4,144,517 may be subjected to temperatures of 500° F. or higher due to extremely hot fluids within the conduit, e.g., liquid sodium. Conventional, commercially available ultrasonic couplants are unsuitable for such conditions. For example, the commonly available colloidal grease type couplants will exhibit an excessive degree of thermal outgassing with eventual loss of physical properties and loss of sonic coupling. Such changes would initially lead to constantly changing ultrasonic coupling which could generate erroneous ultrasonic data. Due to outgassing, chemical deterioration, or changed molecular cross-linking the in-service life of common high temperature couplants would be very unsatisfactory at such high temperatures. Because of this relatively short predicted service life, frequent changing of the couplant would be necessary. The cost of these changes would make use of such couplants prohibitive.

A typical prior art couplant material is DOW-CORNING 340 Heat Sink Compound. This material is believed to be described in U.S. Pat. No. 4,738,737 and is a grease-like silicone fluid heavily filled with zinc oxide, as an acoustic couplant material under high-temperature and high-radiation conditions. However, it has been found that such a material does not maintain its sonic properties at high temperatures (e.g., above 500° F.) for a long enough time to avoid numerous changes of couplant.

Accordingly, there has been a long-standing need for a couplant which:

1. provides required acoustical properties in the form of a sound path with good acoustical impedance between a transducer and the pipe or other sonic medium to which it is attached;

2. withstands thermal cycling from room temperatures to temperatures over 500° F., which are common as surfaces upon which sonic devices may be mounted;

3. maintains stable acoustical properties at temperatures over 500° F., for periods of time which may be as great as several years between planned maintenance intervals;

4. emits a minimum of irritating fumes and does not outgas and disturb the sonic path;

5. has a viscosity which provides for ease of application and use; and 6. does not require expensive surface preparation of the conduit or pipe surfaces in the field, such as grinding or machining.

In search of a couplant which would answer all of these lone-standing needs, various materials which were available commercially for other uses were studied. The intent was to identify a material that did not have objectionably high contents of sulfur or lead or other toxic or noxious material; had the ability to perform the ultrasonic couplant function above 500° F.; had a viscosity which was suitable for easy use as an ultrasonic couplant; and did not have hazardous or irritating fumes.

Fluoroether greases were identified as satisfactory couplant materials, particularly two specific fluoroether greases: Nye Fluoroether Grease 849 and Dupont Krytox ® grease. These greases are known fluoroether lubricants; however, nothing suggests that fluorinated ethers, and particularly the Nye Fluoroether Grease 849 and Dupont Krytox ® grease, might be an excellent ultrasonic acoustic couplant material in high temperature environments over 500° F.

SUMMARY OF THE INVENTION

In accordance with the invention, a fluoroether grease is used as a low sonic impedence coupling compound. The invention also proposes a novel method of using the couplant material for establishing a sound path of good acoustical impedance between a transducer and a sound conducting medium to which it is attached. The fluoroether couplant material of the invention is capable of withstanding thermal cycling from room temperature to temperatures well over 500° F., which temperatures often occur in industrial environments. Such fluoroether grease provides a low sonic impedance interface between an ultrasonic transducer and a metal substrate by the steps of applying the grease material between the substrate and the ultrasonic transducer and thereafter mechanically securing the ultrasonic transducer to the substrate which might be, for example, a pipe.

DESCRIPTION OF THE PREFERRED EMBODIMENT

Figure 1:
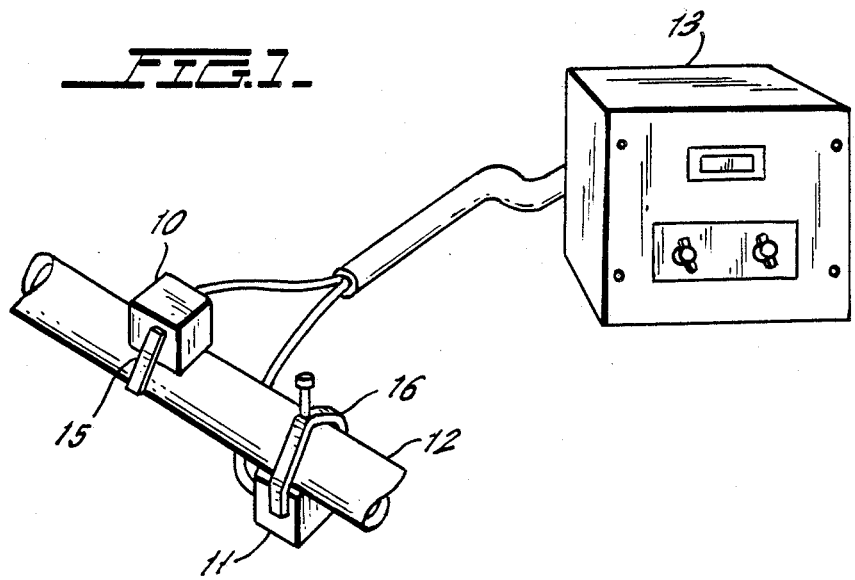
FIG. 1 is a schematic drawing of an ultrasonic flowmeter clamped to a fluid pipe or conduit with the couplant of the invention and further shows a housing for producing and processing ultrasonic signals.

Referring first to FIG. 1, there is schematically illustrated two transducers 10 and 11 which are clamped onto a hollow conduit or pipe 12. Conduit 12 may be of any desired material such as steel, plastic, concrete, or the like, of any given and known wall thickness and which is to contain or conduct any desired fluid, such as water, oil, liquid metals, sewerage or the like. Conduit 12 may have a diameter, typically, from ½ inch to 60 inches, and any desired wall thickness.

Transducers 10 and 11 are clamped on opposite sides of the exterior diameter of pipe 12 by the clamping straps 15 and 16. Transducers could be disposed on the same surface and operate in a reflective mode if desired. The transducers 10 and 11 are longitudinally spaced from one another and may operate as disclosed in U.S. Pat. No. 3,987,674, herein incorporated by reference.

An exemplary ultrasonic flowmeter schematically illustrated in FIG. 1 may be of the type sold commercially by Controlotron Corporation, 155 Plant Avenue, Hauppauge, N.Y. 11788, the assignee of the present invention, under the designation "System 960" or "System 990". Other ultrasonic equipment may be used.

In order to establish an interface of low acoustical impedance between the transducers 10 and 11 and the supporting substrate 12 to which they are connected, the couplant material 20 (see FIG. 2) of the invention is applied between the substrate 12 and the ultrasonic transducers 10 and 11. The transducers are then secured to the substrate 12 mechanically by means of straps 15 and 16 which clamp them to the pipe 12. Straps 15 and 16 are analogous to hose clamps and are schematically shown for illustrative purposes only, since any suitable mechanical clamping means may be used.

Figure 2:
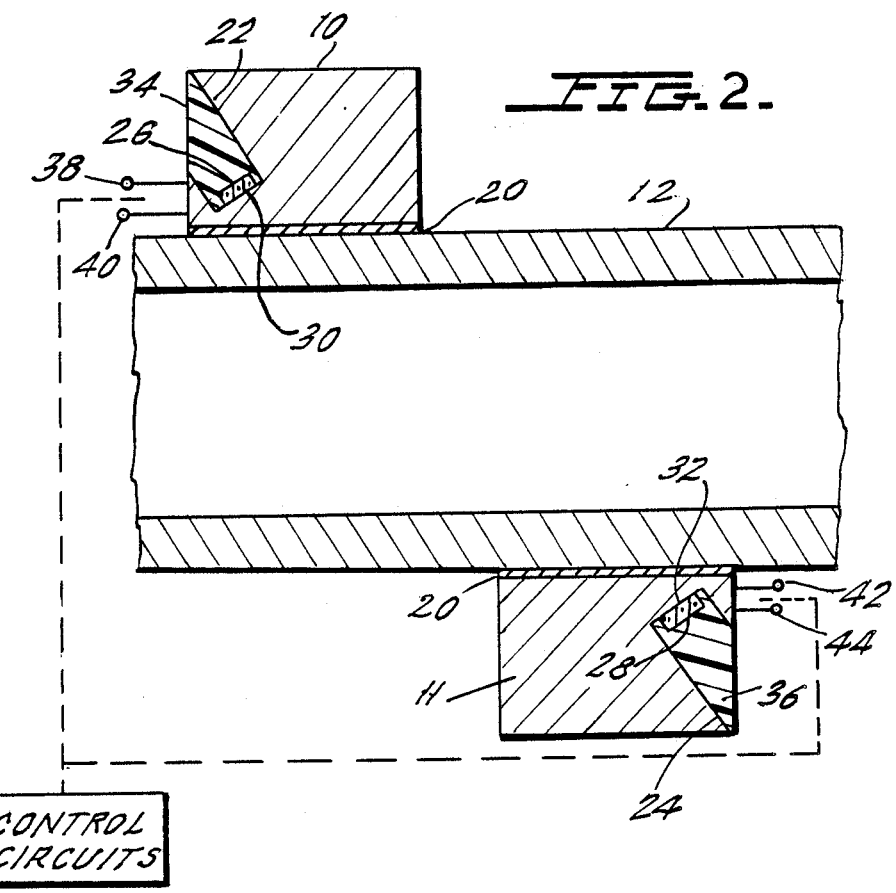
FIG. 2 is a cross-sectional view of the transducers and conduit illustrated in FIG. 1 showing the couplant of the invention.

FIG. 2 is a cross-sectional view through the transducers 10 and 11 and the pipe 12 to which they are coupled and generally shows a typical construction for the transducers 10 and 11, and also shows the couplant 20. Transducer housings 10 and 11 are generally identical to one another and consist of prisms of any desired material, such as nylon, or the like, which have good sound transmission qualities. The longitudinal velocity of sound in the housings 10 and 11 is lower than the shear mode velocity of sound in the wall of pipe 12. Channels 22 and 24 are formed in housings 10 and 11, and receive active transducer "crystals" 26 and 28, respectively. Active transducer members 26 and 28 may be of any desired type, such as barium titanate ceramic elements, or the like, and are generally flat members having active flat faces which face the outer surface of conduit or pipe 12, and are arranged to produce ultrasonic energy in pulse form in a direction perpendicular to the base 30 and 32 of slots 22 and 24, respectively. The channels 22 and 24 are then encapsulated with any suitable plastic encapsulating material shown as encapsulating masses 34 and 36, respectively.

Transducer elements 26 and 28 are then provided with terminals 38, 40 and 42, 44, respectively, which are electrically connected to electronic control system 13, which will produce and receive and process ultrasonic signals associated with transducer elements 26 and 28, respectively.

When any transducer equipment is coupled to any container at high temperature, whether it be an ultrasonic flowmeter, such as the "System 990" flowmeter, or another ultrasonic flow detection device, it is important that the couplant material utilized provide a sound path of good acoustical impedance. It is also important that the couplant withstand thermal cycling from room temperature to temperatures over 500° F., and that the acoustical properties remain stable for long periods of time at high temperatures. Moreover, a couplant material, to be practical, must provide no irritating fumes, or in any event a minimum of such fumes, to prevent danger to operators and others in the operating environment. It is also important that the couplant material does not outgas which would disturb the sound path. At most, the pipe, or other substrate, should require only superficial wire brushing to make the sound path connection with the couplant material. All of these traits must be found in a material which is both easy to apply and use and which does not require expensive surface preparations such as by grinding or machining.

It has been found that fluoroether greases provide these characteristics. Two fluoroether greases are preferred: these are Nye Fluoroether Grease 849 and Dupont Krytox ® grease.

Nye Fluoroether Grease 849 is available from Wm. F. Nye, Inc., New Bedford, Mass. This grease is a smooth polytetrafluoroethylene (PTFE) grease recommended as a lubricant for use below 300° C. (572° F.) It has been found that this material has the unexpected property of being an excellent ultrasonic conductor which is sonically and chemically stable at temperatures above 500° F.

The Nye Fluoroether Grease 849 is known as a stable lubricant and sealant. It is known to be resistant to oxidation and thermal breakdown at temperatures over 500° F. Thermal breakdown, according to promotional literature, does not occur below 572° F. It is non-flammable. It is recommended for use in chemically resistant lubrication for stopcocks, valves, and ground-glass connectors, and is said to permit longer exposure to non-fluorinated aggressive chemicals than do traditional chlorofluorocarbon or fluorosilicone-based greases.

The Nye Fluoroether Grease 849 is a member of a series of thermally and oxidatively stable synthetic fluids comprising completely fluorinated polyethers with distinctive properties of high specific gravity, low surface tension, inertness toward most plastics and elastomers, immiscibility with all solvents, except highly fluorinated solvents, and inertness toward normally destructive chemicals. When these completely fluorinated polyethers are gelled with extremely stable, chemically-inert fluorocarbon polymers, the resulting greases are said to afford great lubrication capabilities in extreme environments. Generally, the grease is gelled with a fluorocarbon such that it comprises about 35 wt. % PTFE.

Krytox ® fluorinated grease is available from Dupont Company, Chemicals and Pigments Department Performance Products, Wilmington, Del. This material is a perfluoropolyalkylether (PFPE) grease recommended for use as a lubricant at temperatures ranging from −20° to 300° C. (−5° to 570° F.). It has been found that this material is also an excellent ultrasonic conductor at high temperatures, far superior to the compound proposed for such use in U.S. Pat. No. 4,738,737, and other known couplants.

The Krytox ® grease is known as a general purpose lubricant. It is oxidation resistant and nonflammable to over 300° C. It is recommended for use as a pump seal and bearing lubricant in chlorine environments, an aircraft fuel pump and instrument bearing grease, a valve and O-ring lubricant in oxygen and chlorine environments, etc., and generally is suitable for use in equipment operating under severe conditions.

The Krytox ® grease is a member of a series of fluorinated oils and greases intended for use in applications where high-temperature resistance, nonflammability and nonreactivity with aggressive chemicals is required. This grease has the distinctive properties of high density and compressibility while not promoting rust or corrosion. Furthermore, this grease is compatible with rubber and plastic, and is water resistant.

Krytox ® grease comprises a Krytox ® oil thickened to grease-like consistency by a thickening agent which may be the solid tetrafluoroethylene telomer component of Vydax ® 1000 fluorotelomer dispersion, which is also available from Dupont Company. Krytox ® grease is based upon a series of fluorine-end-capped homopolymers of hexafluoropropylene epoxide with the following chemical structure:

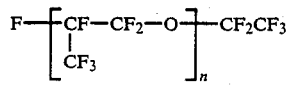

wherein n=7 to 37 (according to "Krytox Fluorinated Lubricants" a brochure of the Dupont Co., page 16).

Applicant has discovered and established that fluoroether greases in general and the particular fluoroether greases known as Nye Fluoroether Grease 849 and Dupont Krytox ® grease make excellent couplant materials for establishing a sound path of good acoustical impedance between a transducer and a supporting wave transmitting substrate in applications where there is thermal cycling from room temperature to temperatures over 500° F. for sustained periods of time. Laboratory tests of months of temperature cycling were conducted without serious deterioration of the ability of the fluoroether couplant material to give a sound path of good acoustical coupling.

Thus, when the material is placed between a substrate and an ultrasonic transducer and the transducer is mechanically secured to the substrate, a method of obtaining good readings is provided. This method, typically, can be used, as shown in the illustrated embodiment, for ultrasonic flowmetering even in high temperature environments.

Of course, the invention can also be employed with other ultrasonic flowmeters also available from the present assignee. It has been tested and found superior to all other known couplants with flowmeter systems under high temperature conditions. This acoustic complant is believed to be superior for use with both permanently and temporarily mounted flowmeters; as well as ultrasonic equipment in general.

Although an illustrative embodiment of the invention has been described, the appended claims are not so limited and should be construed to include modifications and variations which may occur to one of ordinary skill in the pertinent art.

What is claimed is:

1. In combination; an ultrasonic transducer, a conduit for carrying fluid which is at a temperature in excess of 500° F., a clamping structure for clamping a surface of said transducer to the exterior surface of said conduit, and a sonic coupling fluid disposed between said surface of said transducer and said exterior surface; said coupling fluid comprising a fluoroether grease.

2. The combination of claim 1, wherein said fluoroether grease is selected from the group consisting of polytetrafluoroethylene grease and perfluoropolyalkylether grease.

3. The combination of claim 1, wherein the fluoroether grease is a polytetrafluoroethylene grease.

4. The combination of claim 1, wherein said fluoroether grease is a perfluoropolyalkylether grease.

5. The combination of claim 4, wherein said perfluoropolyalkylether grease is a fluorine-end-capped homopolymer of hexafluoropropylene epoxide containing a thickening agent.

* * * * *